March 21, 1944.  L. L. ANDRES  2,344,914
REMOTE CONTROLLER
Original Filed Dec. 31, 1937  8 Sheets-Sheet 1

Inventor
LLOYD J. ANDRES
By Mason & Hatfield.
Attorneys

March 21, 1944.　　　L. L. ANDRES　　　2,344,914
REMOTE CONTROLLER
Original Filed Dec. 31, 1937　　8 Sheets-Sheet 3

Inventor
LLOYD J. ANDRES
By Mason & Hatfield
Attorneys

March 21, 1944.　　　　L. L. ANDRES　　　　2,344,914
REMOTE CONTROLLER
Original Filed Dec. 31, 1937　　8 Sheets-Sheet 4

Inventor
LLOYD J. ANDRES
By Mason Hatfield
Attorneys

March 21, 1944.    L. L. ANDRES    2,344,914
REMOTE CONTROLLER
Original Filed Dec. 31, 1937    8 Sheets-Sheet 5

Inventor
LLOYD J. ANDRES
By Mason & Hatfield
Attorneys

March 21, 1944.  L. L. ANDRES  2,344,914

REMOTE CONTROLLER

Original Filed Dec. 31, 1937   8 Sheets-Sheet 6

Inventor
LLOYD J. ANDRES

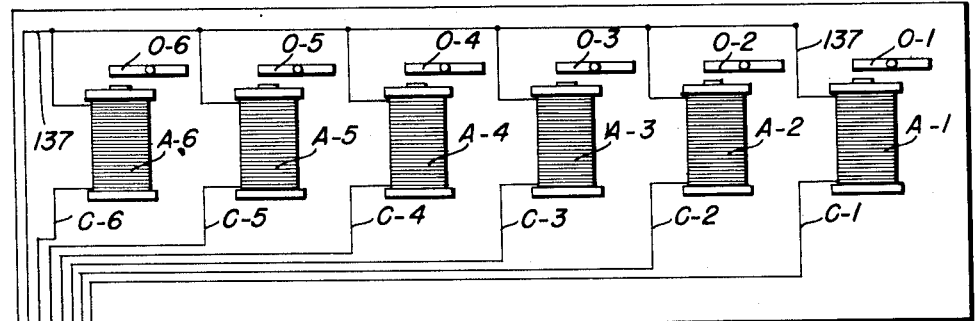
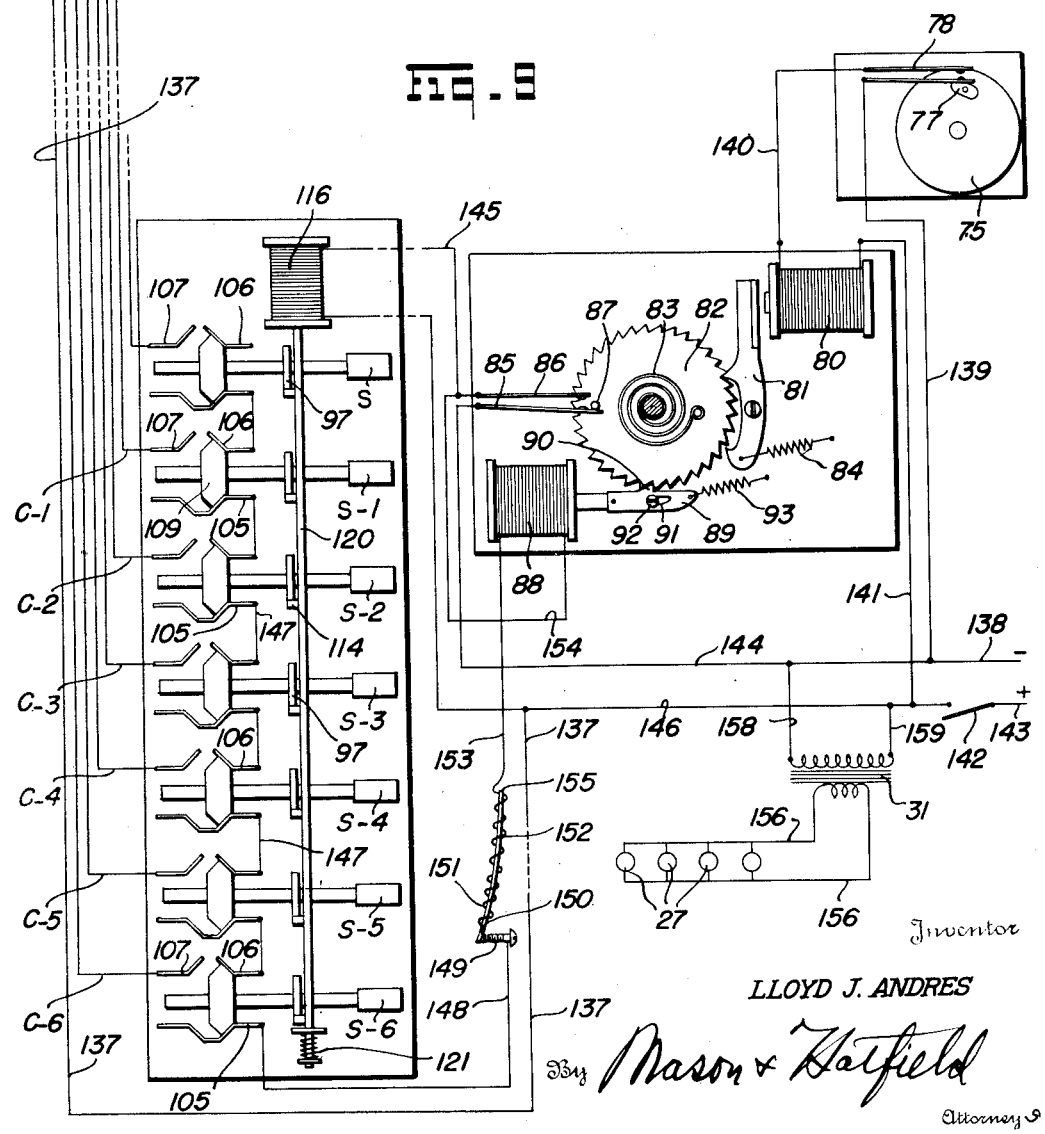

March 21, 1944.  L. L. ANDRES  2,344,914
REMOTE CONTROLLER
Original Filed Dec. 31, 1937  8 Sheets-Sheet 8

Inventor
LLOYD J. ANDRES
By Mason & Hatfield
Attorneys

Patented Mar. 21, 1944

2,344,914

UNITED STATES PATENT OFFICE 2,344,914

REMOTE CONTROLLER

Lloyd J. Andres, Chicago, Ill.

Original application December 31, 1937, Serial No. 182,708. Divided and this application September 14, 1943, Serial No. 502,342

5 Claims. (Cl. 194—1)

This invention relates in general to an electric controller for a plurality of circuits which may be independently energized to perform an electrical function at a distance from the device, and it is more particularly described as a controller for remotely controlling a phonograph mechanism after the insertion of coins of various sizes.

An important object of the invention is in the provision of means for receiving one or more coins and after the coins are inserted, for selecting one or more of the electrical circuits corresponding to designated phonograph selections on the face of the controller, so that after a predetermined number of selections has been made the mechanism is automatically restored to its inoperative state.

In carrying out the invention the controller also includes various means to prevent fraudulent operation without the insertion of coins, and other means to prevent the operator from obtaining or playing selections in excess of those called for by the insertion of the proper coin, or the proper number of coins.

Other objects of the invention will appear hereinafter, the preferred construction and various modifications being illustrated in the accompanying drawings, in which Figure 1 is a front view of a suitable casing in which the operating mechanism is housed;

Figure 9 is a wiring diagram illustrating the operation of the controller; and

Figure 1:
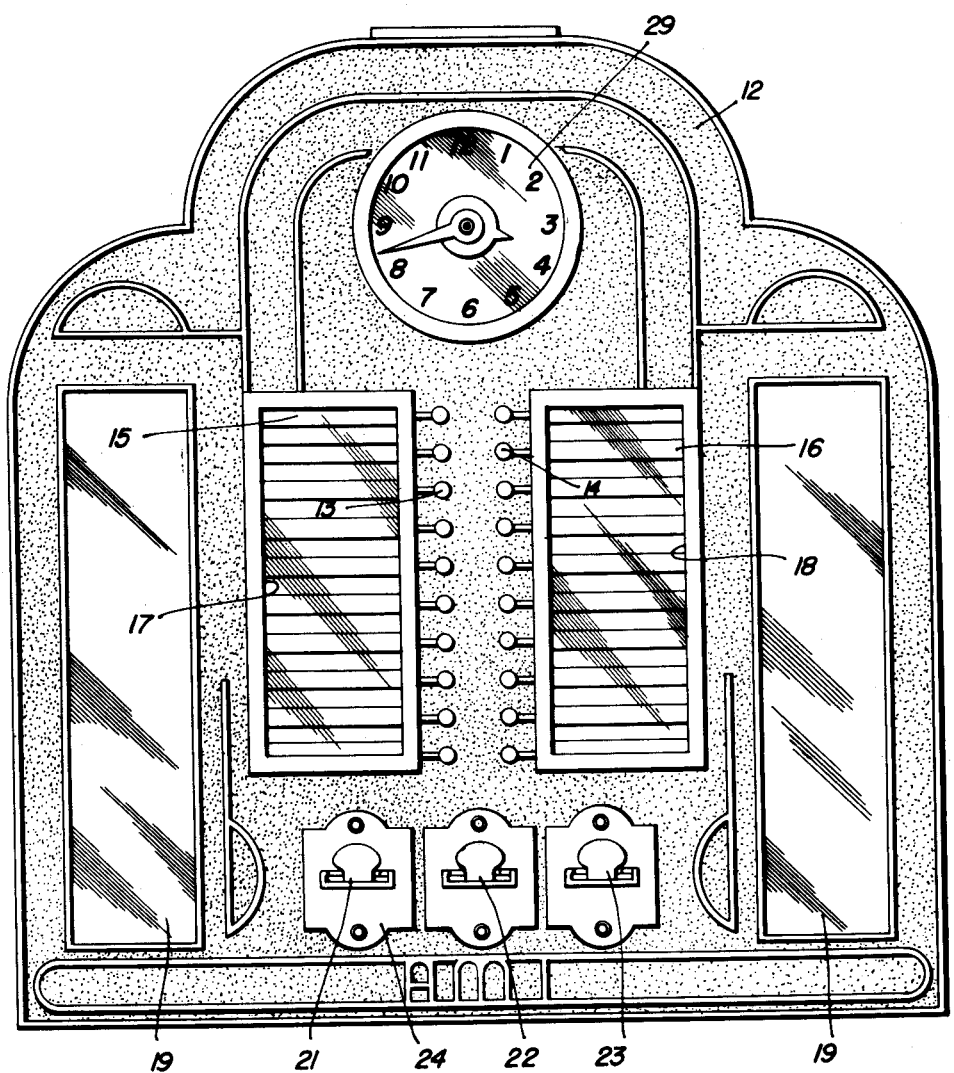

This remote controller is constructed so that it may be operated by the insertion of various coins such as nickles, dimes, and quarters and is electrically connected by means of a multiple cable to any selective device such as a phonograph having electrical means for playing any one of the selected records. It is intended that any record may be selected for play for each five cent value, and a record may be repeated or different records may be played depending upon the multiples of five-cents which are inserted.

Referring now more particularly to the drawings, the mechanism of this controller is assembled and housed in a case or cabinet 12 usually of pleasing structure, design and color. At the center of the front face are two rows of push buttons 13 and 14, which are adjacent to indirectly illuminated program slips 15 and 16, adjustable in frames 17 and 18 corresponding to the selections to be played by a remote phonograph. At each outer side of the frames 17 and 18 is a window 19, and these windows, as well as the program slips, are directly or indirectly illuminated by electric lamps 20 within the casing. The windows 19 may contain pertinent or other advertising matter, and the program slips are usually illuminated so that they can be read more easily.

Directly below the program plates are three conventional coin slides 21, 22 and 23, movable through face plates 24 and adapted to receive ten-cent, five-cent, and twenty-five cent coins respectively.

The front face or wall of the cabinet is preferably of opaque material and the push buttons 13, 14 projecting forwardly therefrom (see also Figure 10), are of transparent or translucent material, each being mounted upon a stem 25 which projects through a plate 26 spaced from the front plate of the cabinet a sufficient distance so that small electric lamps 27 may be placed therebetween. The rear end of each push button is formed with a shoulder 28 which limits its movement in a forward direction, and the rear of the shoulder portion is either painted or coated to make it opaque, or the shoulder itself is opaque so that when the push button is closed it is not illuminated, but as soon as a push button is depressed the outer portion thereof which is translucent will be illuminated by the lamps 27, thereby clearly indicating any of the buttons which are pushed inwardly.

At the upper end of the front of the casing may be a clock 29 for indicating the time as it relates to the controller, and for decoration purposes.

Figure 2:
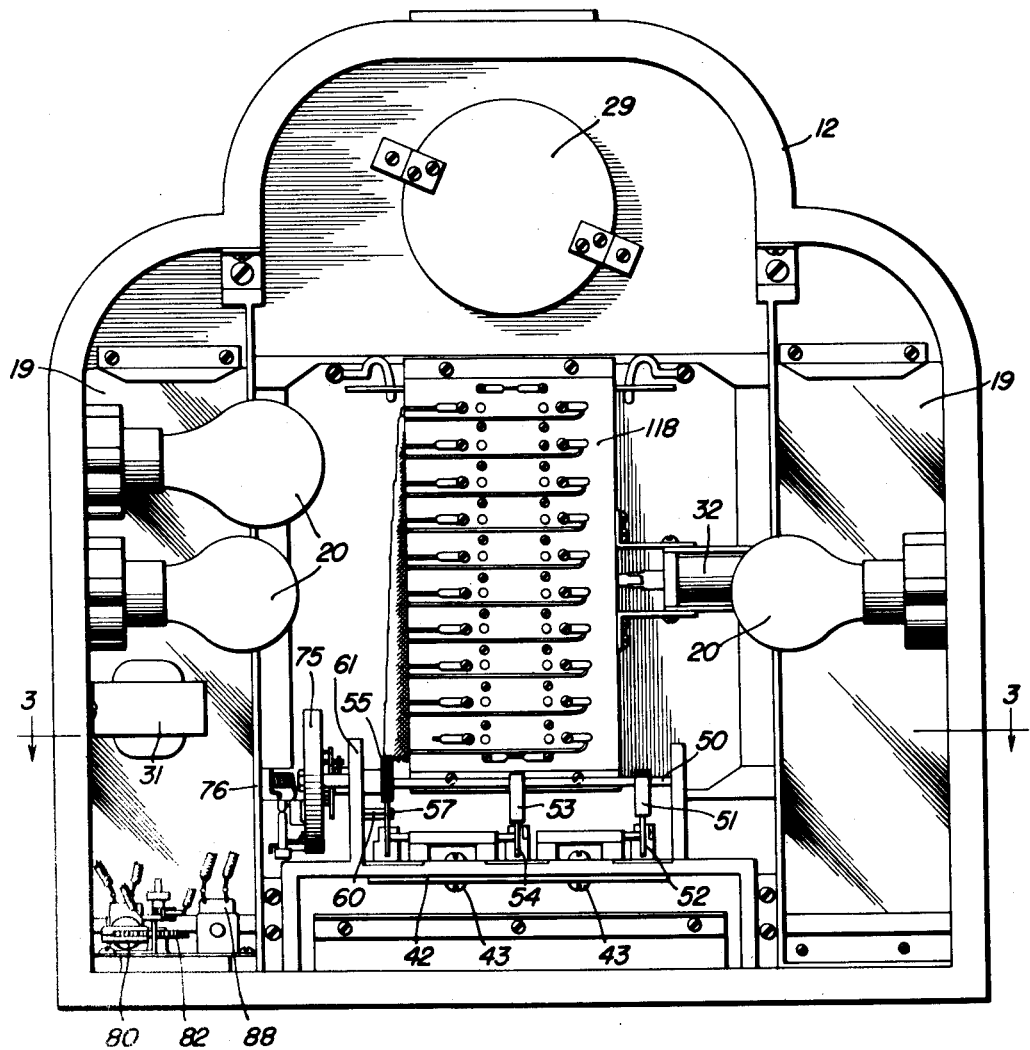
Figure 2 is a rear view of the mechanism enclosed in the casing.
Figure 3:
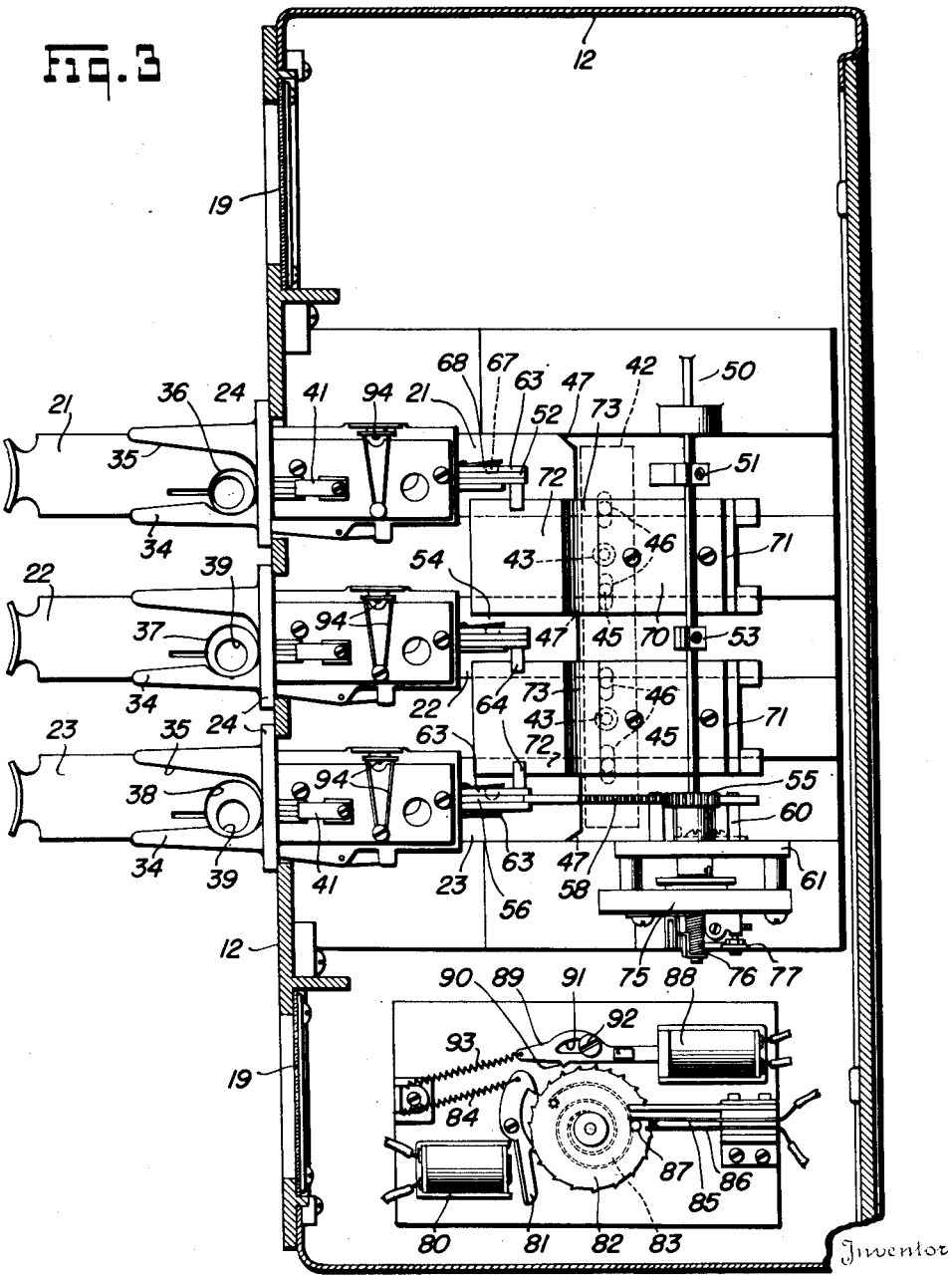
Figure 3 is a sectional view showing the coin slide mechanism taken on the line 3—3 of Figure 2.
Figure 4:
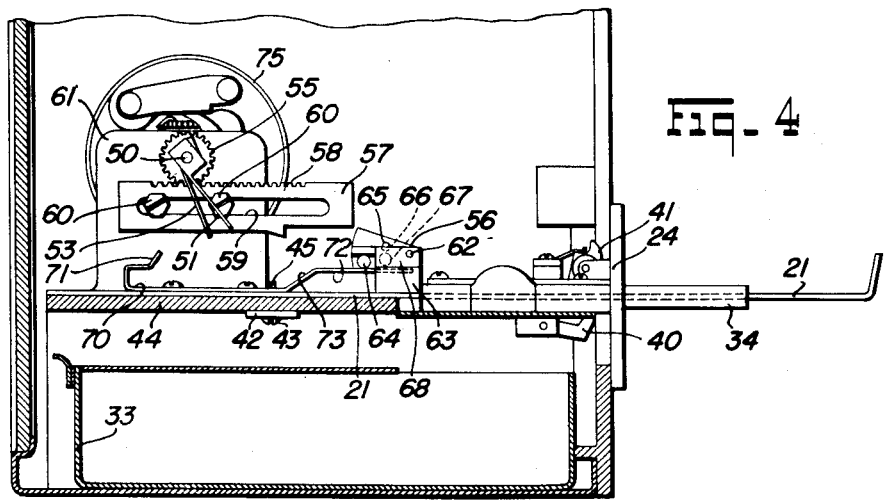
Figure 4 is a side view of the slide mechanism taken on the line 4—4 of Figure 3.
Figure 5:
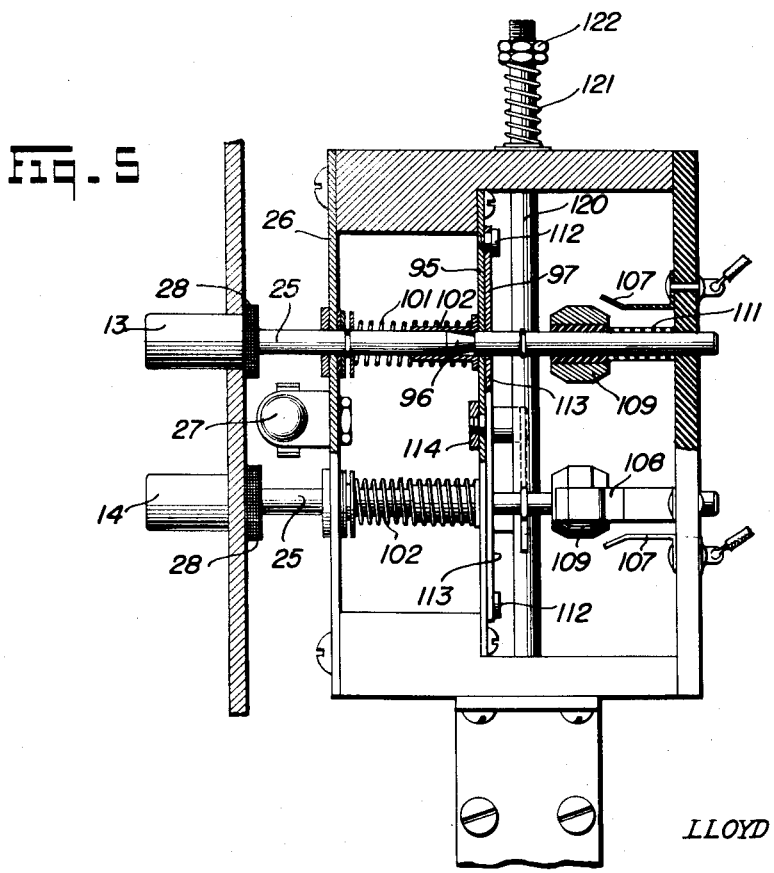
Figure 5 is a sectional view showing a detail of the push button structure.

Also located within the casing is a transformer 31 for furnishing low voltage current to the miniature lamps 27 for illuminating the push buttons; the coin receiving mechanism at the inner ends of the coin slides as shown more clearly in Figures 2, 3, and 4; the selection adding and subtracting mechanism as shown more clearly in Figures 2 and 3; the push button restoring magnet 32; and a metal box 33 at the base of the cabinet for receiving coins inserted in the casing.

Each of the coin slides is slidable in a guide 34 projecting from the face plate and having a recess 35 at the top for allowing the insertion of the proper coin within an opening 36, 37 or 38, of the corresponding slide. At the bottom of each guide is an opening 39 by means of which a coin inserted in the opening of the slide may be dislodged before the slide is pushed inwardly. Each slide includes conventional means for detecting and rejecting spurious coins which forms no particular part of this invention.

Mounted above and below each sliding member of the coin slide (see Figures 3 and 4), are latches 40 and 41 which prevent the slide from moving inwardly until the proper coin is inserted. At one side of each slide is a ratchet device 94 which prevents manual reciprocation or return inward movement of the slide after it has been operatively inserted to the required extent. These safety devices are shown by Patents 1,908,308 and 1,908,752, but form no part of this invention, and are not here described in detail.

At the rear ends of the slides 21, 22 and 23 is a locking device for insuring that only one slide may be operatively inserted at a time, thus preventing an operator from losing plays by inserting two or more slides at the same time. This locking device comprises a plate 42 mounted to move transversely of the slides by means of fastening screws 43 inserted through openings larger than the screws in the plate, and into a fixed support 44. Projecting upwardly from the plate 42 are spaced pins 45 extending through slots 46 in the support 44 beyond the upper side thereof, and into the path of the ends of the slides 21, 22 and 23. The extremities of these slides are cut off angularly at the corners to provide angular shoulders 47 adapted to engage the projecting pins 45 for moving the locking plate 42 accordingly. By reference to Figure 3, it will be seen that the locking pins 45 for the central slide 22 are spaced apart exactly the proper distance to allow this slide to pass between the central pins 45, but in this position if the slide 22 is inserted between them the two outer pins 45 will be locked in the paths of the outer slides 21 and 23 engaging the shoulders 47 thereof, and preventing their inward movement. Likewise, if either one of the outer slides is pushed inwardly its shoulder 47 will engage the corresponding outer pin 45, pressing the locking plate 42 lengthwise and locating other pins directly in the paths of the other slides, thereby preventing their operation.

In operating the slides the five-cent slide produces a single operation or makes provision for playing a single selection, the ten-cent slide two selections, and the twenty-five cent slide five selections. The mechanism operated by the slides is shown more clearly in Figures 3 and 4, and comprises a rotatable shaft 50 positioned above the slides 21, 22 and 23, and mounted in suitable bearings at the ends. Secured to the shaft by a set screw is an arm 51 in the path of a latch 52, carried by the ten-cent slide 21; and an arm 53 similarly secured to the shaft in the path of a latch 54 carried at the rear of the five-cent slide 22. A gear 55 is secured to the shaft opposite a latch 56 of the twenty-five cent slide 23, but this latch engages a slide 57 having a rack 58 in engagement with the gear 55 and mounted by means of a slot 59 and bearing screws 60 which are inserted in an upstanding support 61 so that when engaged by the latch 56 the gear 55 and the shaft 50 will be rotated an amount equal to five steps of the movement of the shaft.

Each of the latches 52, 54 and 56 is mounted upon a pivot 62 at one end between spaced upright supports 63 carried by its slide and has a pin or projection 64 at the other or free end. Each latch is held releasably in either one of two positions by means of recesses or openings 65 and 66 in the latch engaged by a ball 67 seated in an opening therefor in one of the supports 63, and held in this opening by a spring 68 attached at one end to the support and bearing at the other upon the detent ball.

In its raised position with the ball engaging the lower recess 66 each latch will engage its corresponding arm 51, 53 or the slide 57 during the rearward movement of its slide. When each latch is engaged by the detent ball in the upper recess 65, each latch will be held out of contacting position with respect to its corresponding arm or slide 57.

In order to move each latch from one position to another two guides 70 of similar shape are secured to the support 44 over the rear paths of movement of the coin slides and each of these guides comprises an angular hook 71 at the rear end located in the path of one or more of the latch projections 64, a depressed intermediate portion and a raised front portion 72 connected to the intermediate part by an inclined portion 73 such that as a coin slide is moved inwardly its latch 56 will engage and move its slide 57 and near the rear end of its travel will engage the tripping hook 71 which will pull the latch 56 downwardly, disengaging the ball detent from the lower latch recess 66 and engaging the upper latch recess 65, thereby preventing the coin slide from being operatively reciprocated back and forth near the end of its stroke, but allowing it to be moved forwardly, and preventing it from engaging one of the corresponding arms 51 or 53 by such movement because the latch is too low at that time, and only restoring the latch to its operating position when the projection 64 thereof engages the inclined portion 73 of the guide, upon its forward return movement, thereby re-engaging the ball detent with the lower latch recess 66 and placing the latch in position for the next operation.

At one end of the operating shaft 50 is an ordinary telephone contact dial mechanism 75 for making and timing the necessary contacts made by the coin slide latches. This mechanism comprises a spring 76 at the end of the shaft for returning the shaft and the rack plate 58 to its normal position for reoperation by the coin slides. It also includes a gearing and a governor for retarding the gearing (not shown), and rotating a double ended cam contact maker 77 for closing a switch 78 (see Figure 9), in accordance with the actuation of the shaft 50 by the coin slides. In the case of the five-cent coin slide the shaft 50 is rotated sufficiently so that one contact of the switch 78 is made, the ten-cent slide produces rotation sufficient for two contacts, and the twenty-five-cent slide produces sufficient rotation to make five contacts. The timing or retarding of the returning movement is for the purpose of insuring that these operations of the switch 78 will not be too rapid.

Through an electrical circuit closed by the telephone dial switch 78, the adding and subtracting mechanism for playing any number of records, depending upon the denominations of the coins, is brought into operation. This mechanism is shown in position in the casing in Figure 3, and in its diagrammatic relation to the other parts in Figure 9. It comprises a magnet 80 periodically energized by the timed closing of the contacts of the telephone dial switch, thus actuating its armature 81 which includes an escapement pawl for an escape wheel 82 actuated by a spring 83 and the pawl being held normally so that the armature is spaced from the magnet by a spring 84. At one side of the escape wheel are electrical contact fingers 85 and 86 normally held in spaced apart relation by a contact pin 87 carried by the escape wheel. As soon as the magnet 80 receives its first impulse the toothed wheel 82 is moved one step and the pin 87 allows the contacts 85 and 86 to close.

The escape wheel 82 is thus rotated a number of steps corresponding to the coins which have been inserted and an operator may choose the remote control selections which he desires played corresponding to this number of steps by operating the push buttons. For each push button that is operated, the subtracting mechanism will rotate the escape wheel 82 in a reverse direction, by means of a magnet 88 which has an armature with an extension 89 provided with a tooth 90 for engaging the teeth of the escape wheel and having a slot 91 controlled by a projection or screw 92 inserted therethrough, the armature and extension being drawn outwardly by a spring 93 to such a point that the tooth 90 is out of engagement with the wheel 83, thereby allowing the wheel to be rotated by its spring 83 whenever the escapement pawl is operated by the magnet 80. When the magnet 88 is energized its armature and the extension 89 are drawn inwardly and in the return movement caused by the spring 93 the tooth 90 engages one of the teeth of the spring wheel 82, causing a reverse or subtracting movement of the wheel against its spring 83, tending to return the projection 87 to separate the contact fingers 85 and 86. As soon as these contacts are separated there can be no more playing of records until more coins are inserted by the coin slides. The magnet 88 is energized when any one of the push buttons is operated for choosing any of the selections as hereafter explained.

Any desired number of selector buttons 13 or 14 may be employed. This controller shows two rows of ten buttons, each operative to produce a corresponding operation and each row or set having an electrical or a mechanical means for preventing more than one play at a time.

Each push button stem 25 is mounted to slide through fixed plates 26 and 95, spaced apart and located at the rear of the face plate. Intermediate the ends of the stem is a notch 96 so located that when a push button is depressed the notched portion is pressed through the plate 95 where it may be engaged by a latch 97 having a perforation 98 slightly larger than the stem through which the latter extends. On the stem between the plates 94 and 95 is a groove 99 in which a spring collar 100 is seated to form a stop for one end of a button returning spring 101, the spring being mounted at the other end upon a sleeve 102 having an enlarged shoulder 103 which abuts the face of the plate 95. Thus, when any button is pressed inwardly the spring 101 is compressed about the sleeve 102.

The rear end of each stem 25 extends through an insulated back plate 104 upon which are mounted spring contacts 105 and 106 at opposite sides of each stem, and a single contact 107 at one side of the stem at right angles to the other two contacts.

Between the plates 95 and 104 a spring collar 108 is also attached to each stem 25 forming a stop for a contact maker 109 mounted upon an insulating sleeve 110 and slidable upon the stem under the influence of a spring 111 surrounding the stem and disposed between the sleeve 110 and the insulated plate 104. This contact maker is preferably of metal adapted to make electrical connection between the bent tips of the conductors 105 and 106 on opposite sides of the stem or between the conductors 105 and 107 when the push buttons are pressed inwardly. When the push buttons are in their outermost position, the contact makers 109 make a series connection between all of the spring contacts 105 and 106 of adjacent push buttons and when a push button is depressed through its entire range, the contactor 109 makes a connection between the spring finger 105 at one side of the stem, and its conductor 107 at right angles thereto for the purpose of closing a single remote circuit connection. The spring 111 pressing the contact maker 109 tends to make a series connection between the contacts 105 and 106 at opposite sides of each stem except when the push button is depressed through its entire range, as shown by the upper button at the top of Figure 7.

Figure 6:
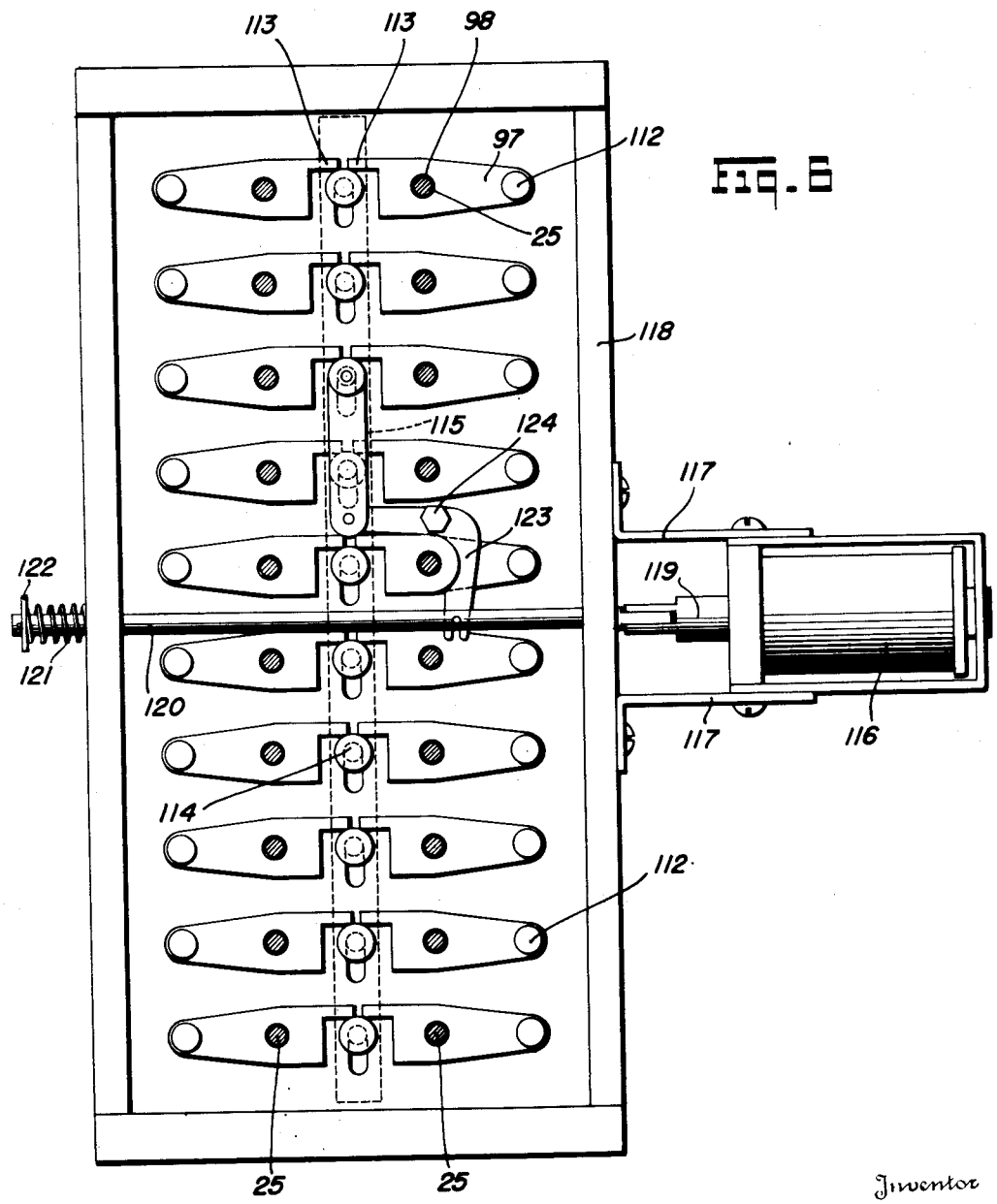
Figure 6 is an elevation showing the push button locking plates.
Figures 7, 8:
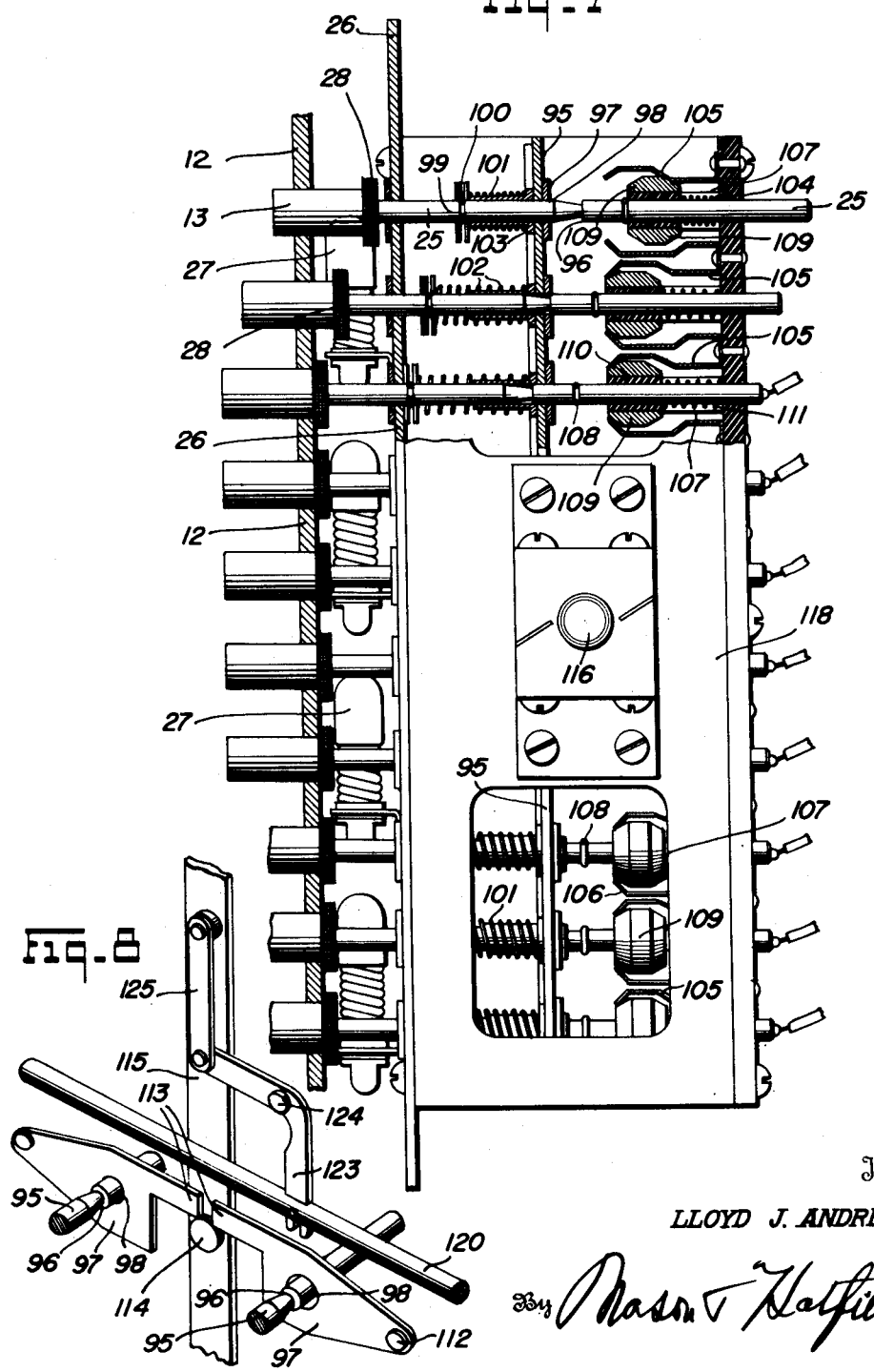
Figure 7 is a view partly in section and partly in elevation illustrating the operation of the push button locking and non-interference means.
Figure 8 is a perspective showing a pair of the push button locking latches.

When any button is released after depressing it through its entire range, it is engaged by its latch 97 and a connected mechanism as shown more clearly in Figures 6 and 8. There is a separate latch 97 for each push button stem 25, the latch being mounted at one end upon a pivot 112 attached to the bearing plate 95 and the other end of the latch having an extension 113 overlying a stud 114 projecting from a vertical bar 115 so that the projections of corresponding buttons of two rows engage the same stud 114.

To operate the bar 115 a magnet 116 is attached by suitable brackets 117 at one side of a frame 118, in which the push button stems are mounted, and has an armature 119 with an attached cross bar 120 extending through the frame 118, and having a spring 121 interposed between the other side of the frame and a washer 122 at the other projecting end of the shaft 120. Connected to this cross bar is one end of an angle lever 123 having a pivot 124 for mounting it intermediate its ends upon the plate 95, and its other end connected by a link 125 with the vertical bar 115. The action of this connection is that when the magnet 116 is energized, the cross bar 120 is pulled against the action of spring 121, causing the vertical bar 115 to move downward and allowing the latches 97 to fall by gravity against the stems 25 of the push buttons. Whenever any stem is pushed sufficiently through the plate 95 so that its latch 97 can engage with the notch 96, the weight of the latch will cause it to engage in the notch, preventing the push button from being returned by its spring 101 to the outermost position. This will expose the outer transparent end of the push button which will be illuminated by one of the lamps 27 indicating that this button has been depressed.

When any push button is depressed to make an operative connection with its contact 107 the series connection through the other buttons is broken, as hereinafter explained in connection with the wiring diagram, and the depression of any other button can have no effect and only the circuit corresponding to the button which is depressed will be energized. This arrangement prevents the operator from obtaining more than one operative connection or one play at a time.

As soon as any button is depressed the escape wheel magnet 88 is energized, bringing the tooth of its pawl 89 back into operative position with the escape wheel 82.

As soon as a push button is permitted to return part way under the influence of its spring 101, and limited by its latch 97, the remote control circuit through the contact 107 is broken and the pawl of the magnet 88 is returned by the action of its spring 93, thus returning the pawl wheel one step. In this position, the series connection is again made through the spring contacts 105, 106, so that any of the other push button control circuits may be established by depressing them singly throughout its entire range.

After a number of plays have been selected by the push buttons corresponding to the coins inserted, the pawl wheel 82 will have returned to its normal position in which the contact pin 87 engages the extremity of contact finger 85, and separates it from contact finger 86, thereby breaking the connection to the magnet 116 and allowing the spring 121 to move the cross bar 120, thus raising the vertical bar 115 and through it, raising all of the latches 97 by the contact of the studs 114 with the extensions 113 thereof, thereby releasing each of the push buttons from the latch engagement of the notches 96 and thereby allowing the springs 102 to return the push buttons to their normal outermost and unilluminated position.

Figure 10:
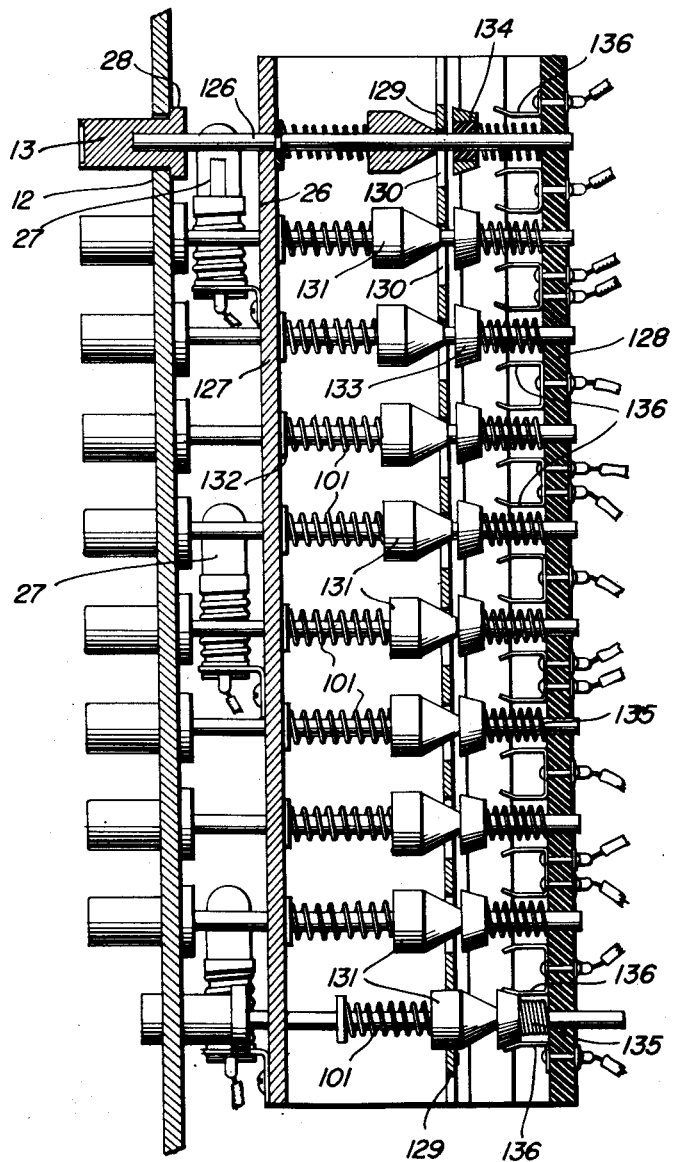
Figure 10 is a sectional view illustrating a mechanical modification of the non-interference locking plate.

A mechanical means of preventing more than one push button from being depressed at one time, is illustrated in Figure 10. In this form each of the push button stems 126 is slidable in front and rear plates 127 and 128, respectively. Between these plates is a slidable plate 129 having perforations 130 corresponding in number to the push button stems, but the center distances between the holes being varied. Slidably mounted upon each stem at one side of the plate 129 is a conical member 131 in which the smaller end of the cone is sufficiently large to engage in the opening 130 of the plate 129 in any position. The larger end of the member will only pass through its opening 130 of the plate when in proper alignment and the conical member is urged into engagement with the plate by a spring 101 surrounding the stem 126 and bearing at one end against the larger end of the conical member and at the other end against a washer 132 fixed to the stem and normally abutting the front plate 127.

At the other side of the plate 129 is a contact maker 133 mounted upon an insulating sleeve 134 secured to the stem and pressed normally toward the plate by a spring 135 bearing at one end against the sleeve 134, and at the other end against the plate 128. Mounted upon the plate 128 at opposite sides of each stem are spring contacts 136 adapted to be engaged by the contact maker 133 when it is sufficiently moved against its spring 135.

Thus, when a single push button is depressed, the plate 129 which is slidable longitudinally, is moved by the conical portion of the cone member 131 so that the corresponding hole 130 in the plate is axially aligned, and the cone then projects through its opening into engagement with the larger portion of the cone, preventing the movement of the plate 129 by the depression of any of the other push buttons. At this time some of the conical members will extend partially into their openings 130 in the plate. The actuated push button whose conical member positions the plate, extends through the hole 130 thereof, and into engagement with the contact maker 133, or its sleeve 134, pressing it against the tension of its spring 135 and into contact engagement with the spring contact fingers 136. Thus, it will be seen that when one of the buttons is depressed, no other button can be depressed until the operated button is returned to its outer or normal position by the spring 135. As soon as the conical member of the depressed button is moved by the spring 135, into engagement with its hole 130 of the plate 129, any of the other push buttons may be depressed, moving the plate into alignment and preventing the operation of any other buttons in the same manner.

In applying this controller it may be assumed in connection with Figure 9 that the push buttons are for the purpose of closing operating circuits to a number of electro-responsive devices A—1, A—2, A—3, A—4, A—5 and A—6, having a number of corresponding push button switches S—1, S—2, S—3, S—4, S—5 and S—6, and S, each device connected to its corresponding fixed switch contact 107 by conductors C—1, C—2, C—3, C—4, C—5 and C—6 and having a common terminal conductor 137, excepting switch S, the connections for which are shown broken to indicate that any further or additional switches may be provided if necessary or desired.

At the start, all of the push buttons are in their normal or outer positions with their contact makers 109 making a series connection between the contact fingers 105 and 106 free from contact with the respective energizing fingers 107. An operator desiring to play a number of selections deposits one or more coins in the slides 21, 22 or 23, which causes a corresponding operation of the timing dial mechanism 75 to rotate the contact maker 77 for closing the switch 78 a corresponding number of times. This energizes the magnet 80 a corresponding number of times, closing an energizing circuit from a main or source of supply as follows: from current supply main 138 through conductor 139, switch 78 and conductor 140 to one end of the magnet winding 80 and thence through the winding conductor 141 and a manually operated switch 142 to the other supply main 143. Each time the magnet 80 is energized it attracts its escapement pawl armature 81, allowing the spring 83 to rotate the escape wheel 82 one step in a clockwise direction, thereby moving the contact pin 87 away from the spring contact finger 85 and allowing the contacts 85 and 86 to close.

Closing the contacts 85 and 86 causes an energizing circuit to be set up through the winding of magnet 116 from the supply main 138 by way of conductor 144 through the contact fingers 85, 86, conductor 145, through the magnet winding 116 and then through conductor 146 and switch 142 to the other main 143. Energizing the magnet 116 causes the operation of the push button latches represented diagrammatically in this figure by the operating bar 120, its spring 121 opposing the magnet, with studs 114 and latches 97. In their outer or unoperated position the push button contact makers 109 are connected in series between their conductors 105, 106, by conductors 147 and the last contact 105 is connected by a conductor 148 through a thermostatic switch comprising a fixed contact 149 which engages a contact 150 mounted upon one end of a movable arm 151 having a pivot 155 at its other end, and controlled by a heating coil 152, the circuit continuing from the contact 151 through the coil 152 extending about the arm and through a conductor 153, thence through the winding of magnet 88 and conductor 154, spring contacts 86, 85, and conductor 144 to one of the main sources of supply 138. When any one of the push buttons is depressed a contact is made with its corresponding fixed contact 107 which leads to the remote control device which is thereupon operated for any desired purpose. In the case of a remote controlled instrument for playing a number of musical selections, the chosen selection is played.

When any push button is depressed, contact 109 first breaks the series connection between contacts 105 and 106, and then makes a connection between contacts 105 and 107, which completes the operative connection desired. Releasing the push button causes latch 97 to engage the stem 25 in a partially depressed position to illuminate the button, and at the same time allowing the contact maker 109 to be returned under the influence of its spring 111 first to break connection with contacts 105 and 107, and then to re-establish series connection between the outer ends of contacts 105 and 106.

The remote controlled mechanism is represented as any one of the electro-magnets A—1, A—2, etc., and assuming that switch S—2 is depressed, the circuit through the magnet winding 88 and through the thermostatic heating device is completed through the series connections 147, and contacts 105, 106, until the contact maker 109 of switch S—2 is reached, which thereupon completes a circuit to its fixed contact 107, and thence through conductor C—2, to magnet winding A—2, which thereupon operates any remote device controlled thereby as presented by O—2, the circuit then continuing through the common return conductor 137 to the conductor 146 and thence through switch 142 to the other current supply main 143.

The circuit closed by any one of the push buttons is intended only to be a momentary or energizing contact which operates the magnet 88 to withdraw its armature and pawl extension 89 in a position to move the escape wheel 82 one step in the restoring direction. As soon as the circuit is broken by the return of the push button, the remote control operating circuit has been set up and that operation will continue until it is completed and breaking the circuit through magnet winding 88 causes the escape wheel to be moved one step in a return direction by its spring 93. If it should happen that the push button switch is held inwardly in closing connection with its contact 107, in an attempt to obtain a repetition of the same remote controlled action or operation, then the thermostatic heating coil 152 becomes heated to such an extent that the arm 151 is deflected about its pivoting point 155 at one end thereof, which operates the contacts 149 and 150 at the other end, breaking the circuit through the magnet 88, and thereupon causing the return movement of the escape wheel 82. This defeats the attempted repetition or continuation of the remote controlling circuit. After a predetermined time the cooling of the coil 152 connects the contacts 150 and 149, and the push buttons may be operated as desired.

An operator may insert any desired number of coins, producing a corresponding number of steps of the escape wheel for any number of push button operations, but when this predetermined number of push button selections has been made in the proper manner the escape wheel is returned until its contact pin 87 engages the spring finger 85 separating it from the contact 86 and thereby breaking the circuit connection through the magnet 116, thereby releasing all of the locking latches 97 and allowing the push buttons to return to their normal outer position under the influence of their springs, as heretofore explained.

To illuminate the transparent portions of the push buttons, the electric lamps 27 may be supplied with current through supply mains 156 extending from a transformer 31 which is connected by conductors 158 and 159 to the other circuit supply mains for the system.

Thus, the controller provides means for individual selection of any number of remote operations, according to the denominations of the coins inserted for that purpose; provision is made for rejecting spurious coins; the controller prevents the selection of more than one operating circuit at the same time; and means is provided for preventing the fraudulent operation of any of the selected circuits.

This application is a division of my application Serial No. 182,708, filed December 31, 1937, now Patent No. 2,331,590.

What I claim is:

1. A coin controlled selective controller comprising a plurality of manually operable coin receivers, each said receiver adapted for the acceptance of coins of different predetermined denominations, a governor controlled electric commutator means, mechanical means operatively responsive to the movement of said coin receivers for operating said commutator means, an electromagnetic computing means responsive to electric impulses, a plurality of electromagnets independently selectively responsive to electric impulses, a plurality of push button operated electric switches corresponding in number to the said electromagnets, a source of electric energy, electric circuit means connecting said source of energy with said commutator means, said computing means, said electromagnets, and said electric switches, whereby the insertion of a coin or coins in said receivers and the manual operation of said receiver or receivers will cause the said mechanical means to close the said commutator means an exact number of predetermined times in accordance with the value of the coin or coins inserted to apply a corresponding number of electric impulses through a portion of said circuit to said computing means and register a predetermined value therein, and whereby the selective operation of any of the said push button switches through another portion of said circuit will energize only a number of said electromagnets corresponding to a predetermined value of a coin or coins inserted and simultaneously through a further portion of said circuit restore the said computing means to its normal inoperative position.

2. A coin controlled selective controller comprising a plurality of manually operable coin receivers, each said receiver adapted for the acceptance of coins of different predetermined denominations, a governor controlled electric commutator means, mechanical means operatively responsive to the movement of said coin receivers for operating said commutator means, an electromagnetic computing means responsive to electric impulses, a plurality of electromagnets independently selectively responsive to electric impulses, a plurality of push button operated electric switches corresponding in number to the said electromagnets, a latch adapted to independently retain each said push button switch in depressed position, an electromagnetic releasing means common to all said latches for releasing any said latches engaged with said push button switches, a source of electric energy, electric circuit means connecting said source of energy with said commutator means, said computing means, said electromagnets, said electric switches, and said electromagnetic releasing means, whereby the insertion of a coin or coins in said receivers and the manual operation of said receiver or receivers will cause the said mechanical means to close the said commutator means an exact number of predetermined times in accordance with the value of the coin or coins inserted to apply a corresponding number of electric impulses through a portion of said circuit to said computing means and register a predetermined value therein and energize the said electromagnetic releasing means, and whereby the selective operation of any of the said push button switches through another portion of said circuit will energize only a number of said electromagnets corresponding to a predetermined value of a coin or coins inserted and said push button operated switches are retained in depressed position by action of said latches and whereby the operation of the last said push button switch corresponding to the total value of the coins inserted will simultaneously through a further portion of said circuit restore the said computing means to its normal inoperative position and through a still further portion of said circuit to de-energize the said electromagnetic releasing means permitting the push button switches to be restored to their normal inoperative positions.

3. A coin controlled selective controller comprising a plurality of manually operable coin receivers, each said receiver adapted for the acceptance of coins of different predetermined denominations, a governor controlled electric commutator means, mechanical means operatively responsive to the movement of said coin receivers for operating said commutator means, an electromagnetic computing means responsive to electric impulses, a plurality of push button operated electric switches corresponding in number to the said electromagnets, a series circuit connecting said switches, a source of electric energy, electric circuit means connecting said source of energy with said commutator means, said computing means, said electromagnets, and said electric switches, whereby the insertion of a coin or coins in said receivers and the manual operation of said receiver or receivers will cause the said mechanical means to close the said commutator means an exact number of predetermined times in accordance with the value of the coin or coins inserted to apply a corresponding number of electric impulses through a portion of said circuit to said computing means and register a predetermined value therein, and whereby the selective operation of any of the said push button switches through another portion of said circuit and the said series circuit will energize in successive sequence only a number of said electromagnets corresponding to a predetermined value of a coin or coins inserted and simultaneously through a further portion of said circuit restore the said computing means to its normal inoperative position.

4. A coin controlled selective controller comprising a plurality of manually operable coin receivers, each said receiver adapted for the acceptance of coins of different predetermined denominations, commutator means, mechanical means operatively responsive to the movement of said coin receivers for operating said commutator means, an electromagnetic computing means responsive to electric impulses, a plurality of operated electric switches corresponding in number to the said electromagnets, another circuit connecting said switches, a source of electric energy, electric circuit means connecting said source of energy with said commutator means, said computing means, said electromagnets, and said electric switches, whereby the insertion of a coin or coins in said receivers and the manual operation of at least one of said receivers will cause the said mechanical means to close the said commutator means an exact number of predetermined times in accordance with the value of the coin or coins inserted to apply a corresponding number of electric impulses through a portion of said circuit to said computing means and register a predetermined value therein, and whereby the selective operation of any of the said switches through another portion of said circuit and the said circuit will energize in successive sequence only a number of said electromagnets corresponding to a predetermined value of a coin or coins inserted and simultaneously through a further portion of said circuit restore the said computing means to its normal inoperative position.

5. A coin controlled selective controller comprising a plurality of manually operable coin receivers, each said receiver adapted for the acceptance of coins of different predetermined denominations, a governor controlled electric commutator means, mechanical means operatively responsive to the movement of said coin receivers for operating said commutator means, an electromagnetic computing means responsive to electric impulses, a plurality of operated electric switches corresponding in number to the said electromagnets, another circuit connecting said switches, a source of electric energy, electric circuit means connecting said source of energy with said commutator means, said computing means, said electromagnets, and said electric switches, whereby the insertion of a coin or coins in said receivers and the manual operation of at least one of said receivers will cause the said mechanical means to close the said commutator means an exact number of predetermined times in accordance with the value of the coin or coins inserted to apply a corresponding number of electric impulses through a portion of said circuit to said computing means and register a predetermined value therein, and whereby the selective operation of any of the said switches through another portion of said circuit and the said circuit will energize in successive sequence only a number of said electromagnets corresponding to a predetermined value of a coin or coins inserted and simultaneously through a further portion of said circuit restore the said computing means to its normal inoperative position.

LLOYD J. ANDRES.